United States Patent [19]

Willisch et al.

[11] 4,146,381

[45] Mar. 27, 1979

[54] METHOD OR TREATMENT AND PURIFICATION OF REFUSE, OR OF REFUSE/SLUDGE MIXTURES BY MEANS OF COMPOSTING

[75] Inventors: Hannes Willisch, Scheurenhof, 5025 Stommeln near Cologne; Guenter Loesche, Dusseldorf, both of Fed. Rep. of Germany

[73] Assignee: Hannes Willisch, Stommeln near Cologne, Fed. Rep. of Germany

[21] Appl. No.: 820,153

[22] Filed: Jul. 29, 1977

[30] Foreign Application Priority Data

Jul. 30, 1976 [DE] Fed. Rep. of Germany ....... 2634209

[51] Int. Cl.² .................... C05F 11/08; C05F 9/00
[52] U.S. Cl. ............................................. 71/9; 71/14
[58] Field of Search ................ 71/8, 14, 64 JC, 64 B, 71/12, 9; 23/259.1; 241/DIG. 38, 70

[56] References Cited

U.S. PATENT DOCUMENTS

| | | | |
|---|---|---|---|
| 2,969,279 | 1/1961 | Pierson | 71/9 |
| 3,078,050 | 2/1963 | Hordinge | 241/70 |
| 3,113,014 | 12/1963 | Foth | 71/9 |
| 3,233,976 | 2/1966 | Varro et al. | 23/259.1 |
| 3,579,320 | 5/1971 | Pesses | 241/DIG. 38 |
| 4,050,917 | 9/1977 | Varro | 71/9 |

FOREIGN PATENT DOCUMENTS

| | | | |
|---|---|---|---|
| 2415068 | 11/1975 | Fed. Rep. of Germany | 71/9 |
| 852492 | 10/1960 | United Kingdom | 23/259.1 |

*Primary Examiner*—Richard V. Fisher
*Assistant Examiner*—Chris Konkol
*Attorney, Agent, or Firm*—Diller, Ramik & Wight

[57] ABSTRACT

This relates to the treatment and purification of refuse by composting in the form of thermal retting. Conventional refuse is treated by the addition of moisture, preferably in the form of sludge, after which it is crushed in a mill and is screened in tube screens with large particles being removed and discarded, intermediate particles being returned to the crushing mill, and small particles being delivered for composting. Metals, particularly ferrous metals, are removed from each of the three classes of screened material and are salvaged.

17 Claims, 8 Drawing Figures

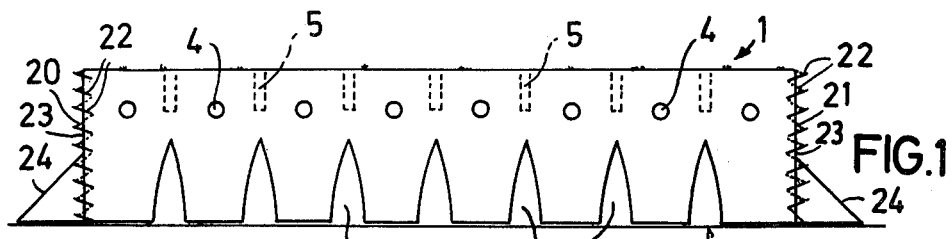
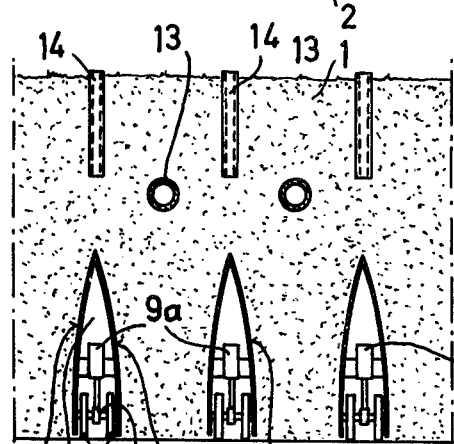
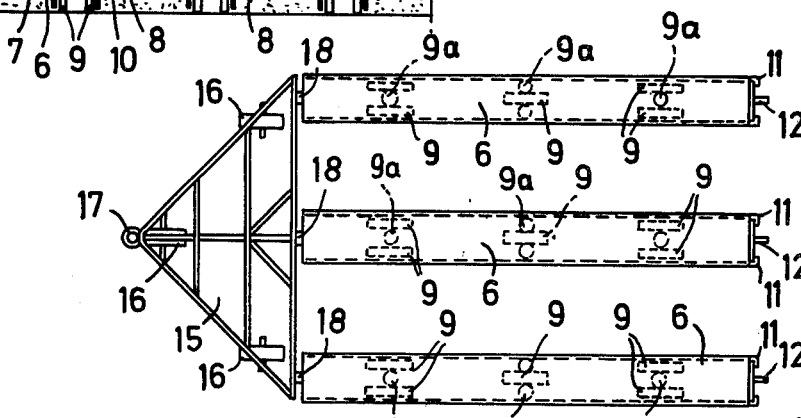
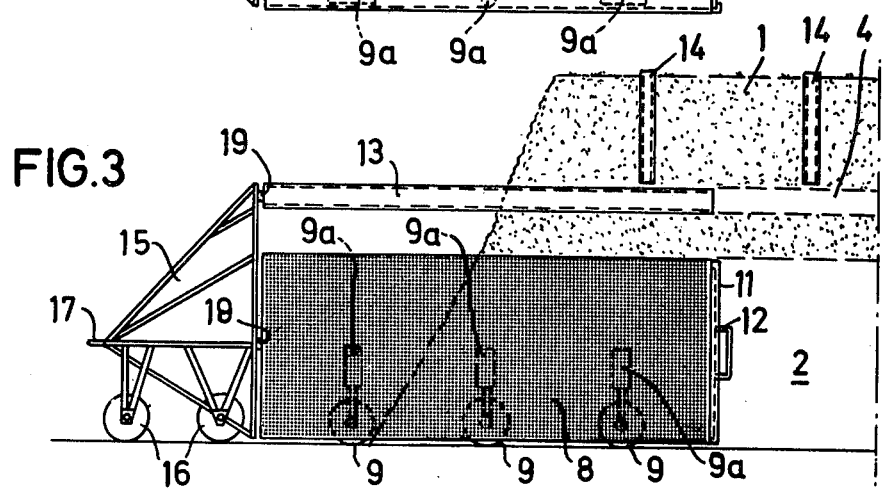

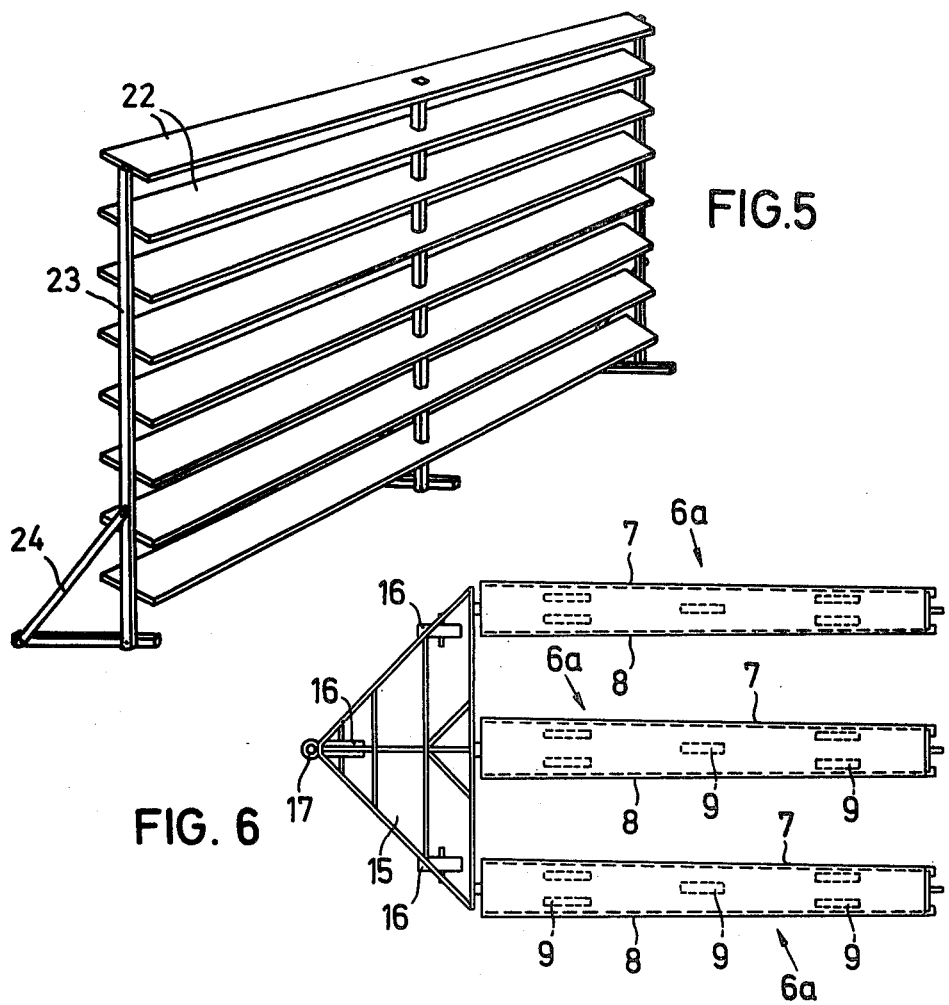
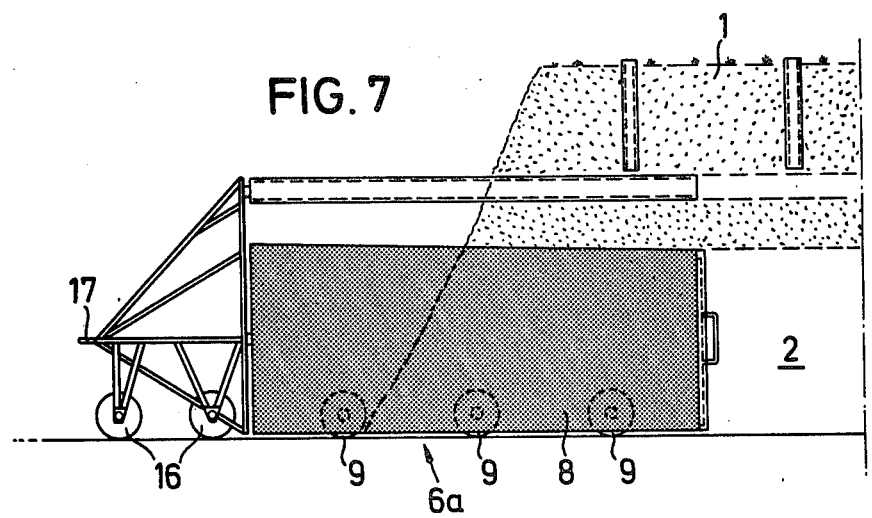

METHOD OR TREATMENT AND PURIFICATION OF REFUSE, OR OF REFUSE/SLUDGE MIXTURES BY MEANS OF COMPOSTING

This invention relates to a method of treatment and purification of refuse, or of refuse/sludge mixtures, by composting in the form of thermal retting, in which the material is crushed and the compostable constituents are segregated by screening.

This invention constitutes in improvement over co-pending application U.S. Ser. No. 734,426 filed Oct. 21, 1976 in the name of Hannes Willisch, and portions of the disclosure of that application are incorporated herein.

For successful, thorough composting of crushed domestic and/or industrial waste or refuse material by thermal retting, the structure and nature of the prior treatment of the refuse is of decisive importance. It is known, before crushing, to add liquid to refuse since refuse in general and domestic refuse in particular contain only 25% to 40% by weight of water, a water content which is insufficient for composting. Thus, it is known to add to the refuse during crushing sufficient water to obtain a sludge with a water content of at least 65% by weight, the sludge thus obtained being subsequently dehydrated before further processing and being returned to a firm condition.

It has been found that the above-described method does not produce refuse material suitable for thermal retting in which the refuse is allowed to settle and thereby is brought to a completely hygienic state. In the crushing plant, a sludge mass is produced which is so viscous and mushy that it cannot be sifted. Furthermore, the refuse is not sufficiently homogeneously reduced by the crushing plant when mills, such as pug mills, hammer mills, impact mills, roll crushers, and the like are utilized. Since the refuse is heterogeneous material including, in addition to soft material, tougher substances such as glass, paper, plastic, rubber and metal, portions remain in the refuse whose dimensions widely exceed the desired grain size. These have an extremely adverse effect upon the retting process during composting and prevent complete and thorough ventilation of the compost stacks to obtain correct aerobic bacterial activity. Upturning of the compost stacks does not produce the desired result since the initial structure of the refuse material is unsuitable for composting. Moreover, dehydration and upturning of the stacks are expensive operations.

Experiments have also been made in employing hammer or percussive actions to reduce the refuse in preparation for composting by the use of suitable mills such as are already employed for other purposes. These types of milling do not, however, provide a satisfactory result since the material contained in the refuse is of such heterogeneous character to prevent proper crushing. A shredding or grinding tool does not crush sufficiently fine, but instead segregates. All types of substances contained in the refuse are not finely reduced.

Where an impact or percussive action is employed, the soft material is converted into a pasty consistency or a powder, while the harder material in general remains too coarse. Furthermore, it is not possible for the refuse to retain its moisture in the mill since the liquid simply runs through. Thus the refuse cannot maintain the desired constant moisture content. Such methods do not provide the prerequisites for the material to be composted by thermal retting. This is also true when water, sewage water and the like is added in order to maintain the moisture content of the produce to be reduced at approximately 50% by weight.

The object of this invention is to produce a refuse material suitable for composting by thermal retting which, when placed layer upon layer in stacks, produces composting by undisturbed aerobic bacterial activity without the occurrence of pockets of decay and the material is entirely and purely composted. The invention is characterized in that, for composting, the crushed refuse material employed has a moisture content of approximately 45% to 55% by weight and a bulk weight or specific gravity of less than approximately 0.4. Further, the tougher or more brittle materials in the refuse, such as metal, wood, glass, ceramics, rubber, plastic, textiles, paper and the like, whether lumpy or flat, are reduced to an approximately similar granularity or shred size corresponding to a preselected grain size.

It has been found that only refuse material of this particular type can be beneficially employed for composting by thermal retting, the material decomposing effectively, completely and homogeneously with the compost stack being exposed only to the surrounding atmosphere. If a moisture content of up to approximately 50% by weight and a specific gravity or bulk weight of less than approximately 0.5 and preferably 0.4 are maintained, the material layered in the stack for composting will have a friable consistency and porosity ensuring that air has access to all particles within the layers. The stacked material will have a sufficiently open pore structure to ensure that the surrounding air can circulate throughout in order to produce the desired thermal retting action. Material of such consistency is capable of absorbing and retaining water without becoming viscous. The low bulk weight of the material, which distinguishes it noticeably from that of other comparable refuse products, permits the existance of a ventilation system as the material is built up into stack form, whereby a quantity of air is initially present which produces a spontaneous composting action with bacterial activity which continues until the retting is complete. The product does not require being rehydrated. With the product for composting being prepared in accordance with this invention, it is no longer possible for anaerobic patches to form in the layer or stack which normally leads to rotting. In addition, it is no longer necessary to employ force ventilation or upturning of the material.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a cross-section through a tunnel stack according to the invention, shown diagrammatically;

FIG. 2 shows part of the cross-section of FIG. 1 on a larger scale;

FIG. 3 is a longitudinal section through the tunnel stack of FIG. 1 on a larger scale and employing the core assembly for producing the hollow spaces in the compost body;

FIG. 4 is a plan view in diagrammatic form of the tunnel core assembly with transporters;

FIG. 5 shows a method of execution of the end wall elements for the compost body;

FIGS. 6 and 7 are diagrammatic views of a tapering tunnel core structure according to the invention, in plan and in longitudinal section.

DETAILED DESCRIPTION OF THE INVENTION

Figure 8:
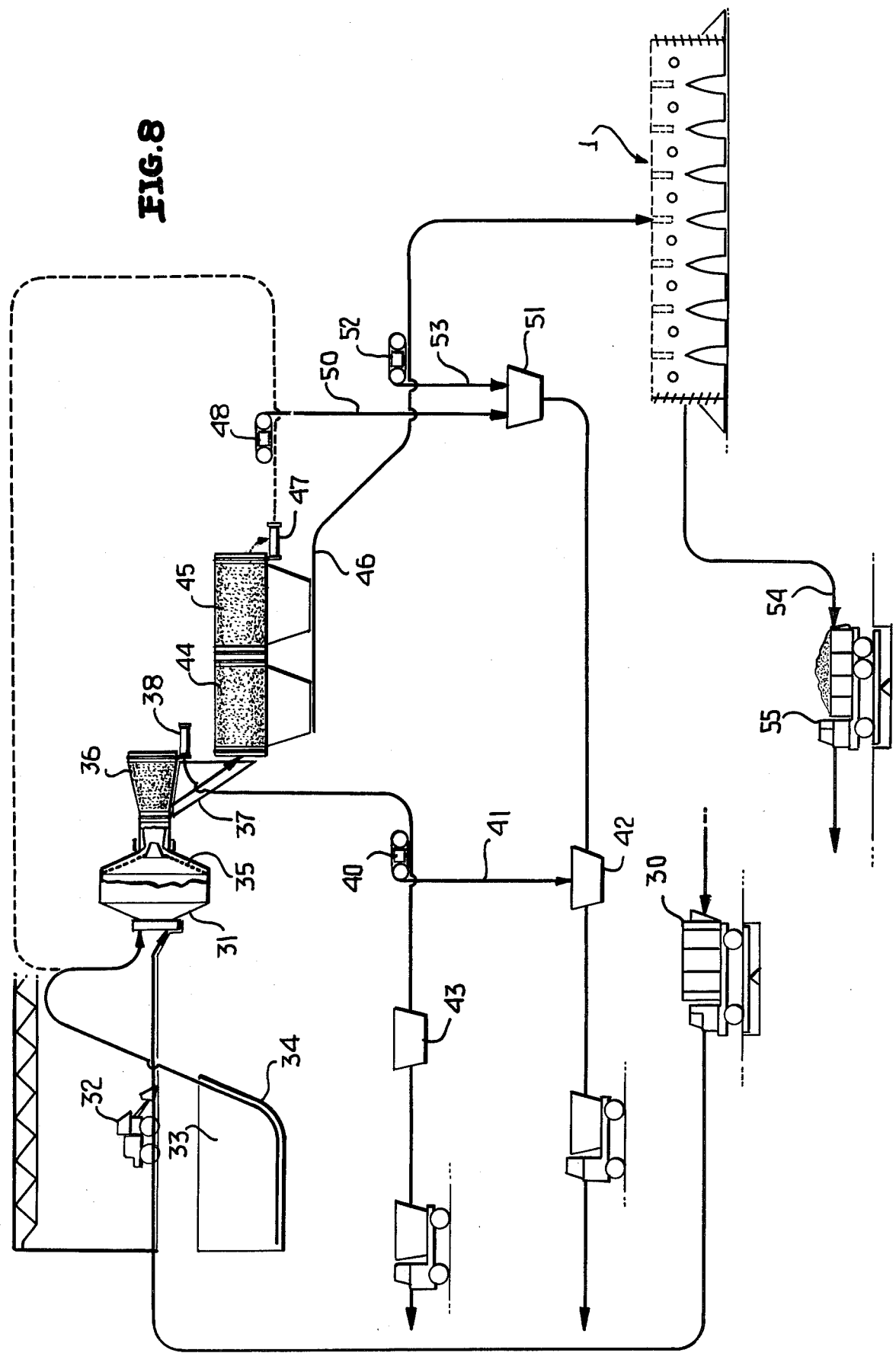
FIG. 8 is a diagrammatic view showing the manner in which refuse and sludge are prepared for composting.

The compost body comprises a mixture of refuse and sludge which has been prepared for composting assumes the form of a stack of any desired length, through which pass in transverse direction tunnel-like courses 2. Said courses 2 are preferably of pointed-arch cross-section and begin immediately from the ground 3 or floor of the site and are spaced longitudinally along the length of the stack. Within the compost body of the stack 1 transerse channels 4 are also provided which are spaced longitudinally along the entire length of the stack. The channels 4 should preferably be located above the tunnel courses 2 but are preferably in staggered relation thereto as shown. In addition there are provided in the compost body of the stack 1 vertical flue-like vents 5 which are formed by suitably constructed tubes 14 having an open outlet at their upper extremity. The vents 5 may be located directly on the axes of the tunnel courses and at a suitable distance therefrom. The vents 5 are arranged in regularly or irregularly longitudinally spaced relation and are also distributed laterally of the stack 1. Such a tunnel system, with associated channels and vents serves to supply the interior of the compost body with sufficient quantities of the ambient air while, at the same time, the longitudinal and vertical passages in the compost body ensure efficient self-aeration of the stack, with active exchange of gasses from the compost material. This self-aeration or natural circulation of ambient air through the stack with inherently low rate of flow reliably stimulates aerobic bacterial activity which is evenly distributed throughout the compost, whereby very soon the heat generated by aerobic bacterial action raises the temperature to a value which may reach as high as 75° C., as a result of which the entire compost body acquires in a short time a fungous texture in the material. Since a compost stack with such a tunnel-, channel- and vent system can be left relatively unattended without the occurrence of patches of rot, excessive damp, "black feet" or the like, bacterial activity over the maturation period is completely undisturbed and is thus highly effective. After a suitable time, for example approximately three months, the compost is fully retted through and purified. The material is now storable and may be used for appropriate purposes. It is very suitable as a soil-conditioner for agriculture and for the reclamation of land for agricultural purposes.

To form the tunnel-like courses 2, core elements 6 are used, the walls 7 and 8 of which carry perforation or are preferably of sieve-like construction. The cores 6 have preferably a cross-section of pointed-arch form and are mounted on rollers 9 so as to be movable. Moreover, the cores 6 can be raised or lowered relative to the rollers 9. This can be done by employing extensible hydraulic raising means 9a connecting the axles 10 of the rollers to the cores 6.

When the compost is being stacked, the tunnel cores 6 are in a raised position relative to the rollers 9. When it is required to withdraw the tunnel core assembly from the compost stack, it is lowered. This produces a gap between the pointed arch shaped walls 7, 8 and the compost, so that the tunnel core assembly can be withdrawn without the compost material being drawn along with it. This gap may be approximately 5 cm. At the end of each tunnel core 6 is a rear wall 11. Slides 12 may be provided on the wall 11 which can be adjusted in either direction in order to regulate the admission of air.

The long channel-like passages 4 are preferably formed by the tubes 13 which extend over the length of the core assembly. The circumferential surfaces of tubes 13 are not perforated suitably in order to ensure an easy withdrawal from the compost stack 1. However, in suitable cases, perforations can be also provided in the tubes 13.

The flue-like vents 5 are formed by the tubes 14 which are inserted vertically into the compost stack 1. The tubes 14 can be withdrawn from the compost stack as soon as it has become self-supporting. They may also remain in the compost stack until the product clamp is removed.

With a height of stack 1 of about 4 to 5 m the tunnel core 6 has an advantageous ogival height of about 2 to 2.50 m, it being possible that the breadth of the tunnel core is about 0.50 to 0.60 m. The length of the tunnel core and also the length of the horizontal tubes 13 is advantageously about 5 to 6 m. The distance of the tunnel core from each other shall be about 1 m to 1.50 m. The flue pipes may have a length of about 1 m to 1.50 m. A diameter of 0.20 to 0.30 m will do generally for the horizontal tubes 13. The flues may have a diameter of 0.10 to 1.15 meters.

For applying the tunnel cores 6, it is advantageous to use a frame 15 provided with wheels 16 and with a hitch loop 17 for being coupled to a tractor or the like. It is advantageous for the frame 15 to be as broad as to permit to trail therewith several tunnel cores 6 by means of corresponding coupling means 18. With a frame 15 any desired number of tunnel cores are drawn continuously along as the erection of the compost stack 1 proceeds and are withdrawn from the stack as soon as it has become self-supporting. The rollers 9 of the tunnel cores 6 are mounted within the cores 6 in order to prevent them from in any way damaging the tunnel 2 which has been formed when a core assembly is withdrawn. As can be seen in FIG. 4, one core assembly may consist of three tunnel cores 6, all joined to a common frame 15 by means of the connectors 18. The horizontal tubes 13 are preferably also connected to the frame 15 by coupling means 19, so that the tubes 13 can also be withdrawn from the compost stack 1 at the same time as the tunnel cores 6 are withdrawn. Thus, each core assembly includes three tunnel cores 6 and two horizontal tubes 13, see FIG. 2. The frame 15 supports all of these elements in cantilever fashion and the frame itself is provided with supporting wheels 16 and a hitch 17 so that the core assembly and frame unit may be withdrawn readily.

Normally, each stack will initially utilize a plurality of core assemblies and corresponding frames 15, disposed in side-by-side relation and properly positioned for forming the tunnels 2 and passages 4. As the building of the stack progresses from one end to the other, the core assembly first covered may be withdrawn and transported to a new site. Then the second core assembly covered may also be withdrawn and transported to a new site, and so on. Thus, there is a progressive withdrawal of core assemblies and transportation thereof to a new site making the process a continuous one.

In order to support the end walls of the compost stack 1 with wall support elements 20, 21 are preferably employed which are so constructed as to provide practically complete access of the surrounding air to the compost material. Accordingly, the wall elements have slats 22 distributed over their height and secured to uprights 23. The slats consist preferably of planks secured between posts. The slats are preferably inclined downward toward the side adjacent to the compost stack, the angle of inclination being capable of adjustment if necessary. For this purpose the slats may be rotatably mounted. The surface inclined downward toward the compost stack ensures that rain, etc., is not allowed to run down the exposed side of the end walls, which might lead to the gathering of water at the base, with the consequent risk of "black feet" occurring in the compost stack. The rainwater directed toward the stack is absorbed into the stack itself and the efficient ventilation system ensures that the moisture absorbed into the stack is quickly vaporized by the generation of heat in the stack.

The end walls preferably assume the form of upright supports 24. Their length should correspond to the length of the tunnel cores 6. The height of the end walls should be that of the intended compost stack 1 to be formed. The walls 20, 21 may be withdrawn from the compost stack 1 as soon as the stack, due to the fungous structure resulting from bacterial activity, has become self-supporting and has formed a body of fixed shape.

In the case of the embodiment according to FIGS. 6 and 7, the tunnel cores are so constructed that they taper longitudinally, vertically and laterally. The decrease in height of the tunnel core 6a over its length (which is, for example, in the region of some 5 m to 6 m) may preferably be maintained between approximately 2% to 5%. If the height of each tunnel core 6 at the fixed end thereof is, for example, 2.50 m the height at the opposite or free end of the core might amount to approximately 2.40 m. By employing such a very slight variation in height, the pointed arch shaped hollow course 2 within the stack remains practically unaltered in height.

The width of each tunnel core 6 is intended to decrease over its length to a greater degree. This decrease should be up to approximately 30% and possibly a little over. If, for example, the tunnel core 6a has a width at the fixed end of approximately 0.6 m the width at the opposite or free end should be only approximately 0.4 m. These figures apply especially to a tunnel core approximately 5 m to 6 m long. By this form of construction, withdrawal of each core assembly is facilitated without the necessity of lowering it somewhat.

It will be appreciated that a stack of material to be composted may be initiated by placing a series of core assemblies, each as shown in FIG. 3 for example, adjacent one end wall structure 20. The layering or piling of the material can then start at this end of the assembly, proceeding along the series of core assemblies. The vent pipes 14 can be inserted as the depth of the material increases above the tunnels 2 and as soon as the material becomes self-supporting at the starting end of the stack, the first covered core assembly may be removed and transported to the end of the series, and so on, until a desired length of stack is achieved, at which position another end wall structure 20 is placed. The vent pipes 14 are also progressively removed as the material becomes self-supporting.

Whereas the minimum rate of decrease in height of the tunnel core will be between approximately 2% and 5%, this decrease can be higher, too. On average, the slightly wedge-shape of the tunnel template should be achieved satisfactorily with a taper of approximately 8% to 20% with a mean of some 10%.

According to this invention, a refuse material 30 is provided and this is moved into a cascade mill 31 by suitable material handling devices 32 together with sludge and sludge water 33 from a suitable supply 34. The cascade mill is a tube mill whose length is smaller than its diameter and which has an outlet grid or screen 35 of a predetermined mesh. In this type of mill the material is constantly trickling back down into the continuously rotating grinding drum in which it is ground by friction. A greater part of the grinding operation is effected autogeneously, that is to say the harder and more brittle pieces of the material introduced are ground one against the other, thus reducing the soft material. This action may be accelerated by the insertion of grinding balls which assist in the grinding operation.

The heterogeneous refuse material is generally crushed to a smooth consistency, that is to say the coarse particles obtained, as also the finely and superfinely ground particles, from the various materials, are approximately of similar consistency. Of the inorganic substances, glass is hardly recognizable; plastic is shredded; and of the lumpy and also flat or sheet-like initial products, wood is finely distintegrated and rubber is ground down or crumbled. Non-ferrous components such as cans of light metal and the like are reduced to fine shreds. Even soft constituents remain predominantly intact and are of lumpy or granular form. A high degree of reduction of excellent homogeneity is obtained in one grinding stage. The moisture content of the combined refuse and sludge material is initially controlled so that the crushed mixture will have a moisture content of preferably 50% by weight, which ground mixture can be screened. Choking of the outlet screen 35 and the output channels of the mill 31 located behind the screen does not arise. An aerated, friable product is obtained with the product having excellent moisture retention properties. The properties of the crushed product are such that there is no difficulty in sifting the material through various screens to obtain different particle sizes.

The crushed material is preferably directed from the mill 31 into a tube screen 36 wherein particles having a size of 50 mm or less are delivered to a chute 37 and the non-crushable products having a larger size are directed onto a conveyor 38 for discharge.

The discardable materials preferably pass a sorting magnet arrangement 40 where at least ferrous metals are removed and directed along a path 41 to suitable collecting means 42. The discarded material is directed to a suitable collecting means 43 and means are provided for suitably delivering the collected materials.

The ground material having a particle size less than 50 mm to 55 mm is directed to further tube screens 44, 45 wherein material having a particle size up to approximately 15 mm is removed along a flow path 46. Crushed material having a particle size between approximately 15 mm and 45 mm to 55 mm are directed onto a conveyor 47 and is passed by a magnetic metal remover 48 and then is redirected into the mill 31. Collected metal is directed along a path 50 to a collection device 51 and is removed in the same manner as is the collection device 52.

The larger particle size crushed material being recirculated through the mill provides for a high yield of compostable material from the refuse.

The particle size of the refuse when ready for compositing should not exceed approximately 15 mm in one dimension. This applies to crushed rough or brittle substances, especially wood, as well as the other refuse materials. Lumps of this size do not impede circulation of air in the stack.

The small particle size material pass a further magnetic metal removing device 52 which also directs removed metal along a path 53 into the collecting device 51.

The remaining small particle crushed material is then stacked for composting in the manner more specifically described in U.S. application Ser. No. 734,426 as is set forth hereinabove.

After composting is completed, the composted material is delivered along a path 54 by any suitable conveying means, such as a truck 55 to a place of use for the composted material.

It is preferable to regulate the moisture content of the material before crushing by the addition of dry retted material so that the rate of water or liquid sewage supply can be maintained constant. Thus certain of the composted material will also be directed into the mill 51. Addition of liquid or sewage to the new refuse and to the ground returning refuse in circulation may be in the proportion of 1:5 to 1:1, liquid to refuse. It is to be understood that this is governed by the nature of the new refuse and the moisture content thereof which may fluctuate between 20% and 40% by weight.

The tube or cascade mill provides for a continuous operation with a very large throughput. The mill itself may have an extremely large capacity, for example on the order of several hundred tons. The drum sieves or tube screens 36, 44 and 45 have proved suitable in assisting and keeping the crushed refuse in a loose state.

In the manner of preparing the refuse material described hereinabove, the heterogeneous refuse material and sewage are reduced, mixed, kneaded together and rendered homogeneous in a single continuous work operation. A very high degree of homogeneity is obtained. With the particular type of reducing action provided by the tube or cascade mill, the crushed product acquires a moisture-retention quality and absorptive efficiency (wick effect) amounting to as much as approximately 50% moisture by weight without the product becoming sticky, viscous or lumpy. Moreover, the material obtained has a high porosity, resulting in a water content of 50% or even as high as 60% of the entire volume.

With the crushed product having a grain size not exceeding 15 mm, tough or brittle substances, such as glass, metal, stones, ceramics and the like, will be segregated during the actual screening of the material by stacking on the principle of windrowing. The finished product can be built layer upon layer to form a stack, preferably one with longitudinal, tunnel-like courses, which are relatively high (in excess of 4 m) without the product solidifying under its own weight or becoming waterlogged at the base of the stack. After the stack has been built in accordance with the aforedescribed method, the product does not require any further manipulation, such as forced ventilation, watering, upturning, screening, crushing or windrowing. It is in all respects suitable for storing and may be employed for other purposes. It serves mainly as a soil conditioner in agriculture and for recultivation of the soil.

Although only a preferred embodiment of the refuse and sludge preparing method has been specifically illustrated and described herein, it is to be understood that variations may be made therein without departing from the spirit and scope of the invention as defined by the appended claims.

We claim:

1. A method for the treatment and purification of particulate waste material capable of being composted comprising the steps of supplying refuse, crushing the refuse in a tube mill having a length smaller than its diameter to form particulate refuse material having a preselected grain size on the order of 15 mm and smaller in one dimension and a specific gravity on the order of 0.4 to 0.5 and less, piling successive layers of the particulate refuse material to provide an elongated stack thereof, forming a plurality of spaced tunnels in the stack of particulate refuse material capable of being composted by utilizing a plurality of apertured, elongated cores, and withdrawing the cores from the stack after the latter has become self-supporting.

2. A method for the treatment and purification of particulate waste material capable of being composted comprising the steps of supplying refuse, adding moisture to the refuse, and crushing the refuse in a tube mill having a length smaller than its diameter to form particulate refuse material having a preselected grain size on the order of 15 mm and smaller in one dimension, and a moisture content on the order of 45 percent to 55 percent by weight, a specific gravity on the order of 0.4 to 0.5 and less, piling successive layers of the particulate refuse material to provide an elongated stack thereof, forming a plurality of spaced tunnels in the stack of particulate refuse material capable of being composted by utilizing a plurality of apertured elongated cores, and withdrawing the cores from the stack after the latter has become self-supporting.

3. The method of claim 1 wherein crushed refuse material having a particle size exceeding approximately 45 mm to 55 mm is discarded.

4. The method of claim 1 wherein tough and brittle materials are segregated during piling on the windrowing principle.

5. The method of claim 2 wherein the moisture content of the crushed refuse material is regulated for composting by the addition of dry retted material.

6. The method of claim 1 wherein said moisture includes sludge liquid admixed with the refuse material.

7. The method of claim 2 wherein the moisture is added in the proportion of from 1:5 to 1:1 moisture to refuse.

8. The method of claim 7 wherein said moisture includes sludge liquid.

9. The method of claim 1 wherein at least ferrous metals are removed from said refuse material prior to the performance of said piling step.

10. The method of claim 9 wherein the ferrous metals thus removed are of a particle size on the order of 15 mm.

11. The method of claim 2 wherein the added moisture is in the form of sludge, and said sludge and refuse are reduced, mixed, kneaded together, and rendered homogeneous in a single work operation.

12. The method of claim 2 wherein the crushed refuse material has a water content on the order of 50% to 60% by volume.

13. The method of claim 1 including the step of screening the crushed refuse material by means of at least one tube screen.

14. The method of claim 2 wherein crushed refuse material having a particle size exceeding approximately 45 mm to 55 mm is discarded.

15. The method of claim 2 wherein tough and brittle materials are segregated during piling on the windrowing principle.

16. The method of claim 2 wherein said moisture includes sludge liquid admixed with the refuse material.

17. A method for the treatment and purification of particulate waste material capable of being composted comprising the steps of providing particulate refuse material having a specific gravity on the order of 0.4 to 0.5 and less, piling successive layers of the particulate refuse material to provide an elongated stack thereof, forming a plurality of spaced tunnels in the stack particulate refuse material capable of being composted by utilizing a plurality of apertured, elongated cores, and withdrawing the cores from the stack after the latter has become self-supporting.

* * * * *